United States Patent [19]

Schlangen

[11] Patent Number: 5,241,253
[45] Date of Patent: Aug. 31, 1993

[54] CONTROLLER FOR TWO-SPEED FANS IN VAV SYSTEMS HAVING INLET VANES

[75] Inventor: Andrew J. Schlangen, La Crescent, Minn.

[73] Assignee: American Standard Inc., New York, N.Y.

[21] Appl. No.: 805,152

[22] Filed: Dec. 11, 1991

[51] Int. Cl.$^5$ ............................................. H02P 5/04
[52] U.S. Cl. .................................. 318/779; 318/806; 318/481
[58] Field of Search ................. 318/778, 779–783, 318/786, 789, 790, 791, 793, 798, 806, 445, 446, 447, 452, 453, 590, 592, 471, 461, 466, 481–482

[56] References Cited

U.S. PATENT DOCUMENTS

| | | | |
|---|---|---|---|
| 3,887,854 | 6/1975 | Parks | 318/224 A |
| 3,932,729 | 1/1976 | Schangen | 219/486 |
| 4,262,225 | 4/1981 | Hildebrandt et al. | 318/793 |
| 4,341,987 | 7/1982 | Fisher | 318/774 |
| 4,384,312 | 5/1983 | Fry | 361/24 |
| 4,388,581 | 6/1983 | Bhatnagar | 318/789 |
| 4,403,178 | 9/1983 | Kaminski | 318/484 |
| 4,453,118 | 6/1984 | Phillips et al. | 318/779 X |
| 4,689,533 | 8/1987 | Yang | 318/281 |

Primary Examiner—William M. Shoop, Jr.
Assistant Examiner—David Martin
Attorney, Agent, or Firm—William J. Beres; William O'Dirscoll; Peter D. Ferguson

[57] ABSTRACT

A controller for operating a two-speed fan motor at one of two speeds and for selecting the appropriate speed in response to conditions such as a maximum and minimum duct static pressure in a fan unit having moveable inlet guide vanes for controlling air flow rates through the fan unit when employed in a variable air volume system. Position sensing switches are provided on the fan unit for indicating to the controller when the inlet guide vanes are in their preferred switching positions, which may be full open or full closed. The controller then selects one of the two fan speeds as appropriate within an operating deadband limit which serves to prevent undesirable changes of motor speed.

20 Claims, 2 Drawing Sheets

CONTROLLER FOR TWO-SPEED FANS IN VAV SYSTEMS HAVING INLET VANES

TECHNICAL FIELD

This invention pertains generally to fan units for use in systems useful for supplying heating or cooling air in buildings and specifically to an improved controller for two-speed fan units to be used in variable air volume building air supply systems.

BACKGROUND ART

Variable air volume (VAV) air supply systems typically include heat exchangers for providing a source of heating or cooling, as required, to the air circulated through the air supply system. The heat exchanger is preferable maintained at a relatively constant temperature, while the volume of air circulated through the building air supply system is varied within predetermined limits to ensure that the temperature within the building is kept relatively constant.

In order to vary the volume of air circulated within the VAV system, several means have been previously employed to vary the fan throughput volume. These means have included variable speed direct current or eddy current motors, frequency inverters, two-speed fan motors, moveable inlet guide vanes and variable sheave drive pulley and belt systems. However, these means of controlling the fan have typically included a relatively complex electronic controller or a relatively large number of mechanical components, or both, and therefore have been relatively expensive to install and also have had high maintenance requirements.

Therefore, it is an object of the invention to provide an improved controller for operating a two speed fan motor in conjunction with inlet guide vanes for controlling the air volume throughput in a fan unit.

It is another object of the invention to provide such a controller which is inexpensive and easy to implement.

It is yet another object of the invention to provide such a controller as will be simple and have a low maintenance requirement.

These and other objects of the present invention will be apparent from the attached drawings and the description of the preferred embodiment that follows hereinbelow.

SUMMARY OF THE INVENTION

The subject invention comprises a fan unit suitable for use in a VAV air supply system including a two-speed fan motor, inlet guide vanes and an electronic controller responsive to the position of the inlet guide vanes or to the static pressure in the VAV air supply system, or both, to control the speed of the fan motor.

DESCRIPTION OF THE PREFERRED EMBODIMENT

Figure 1:
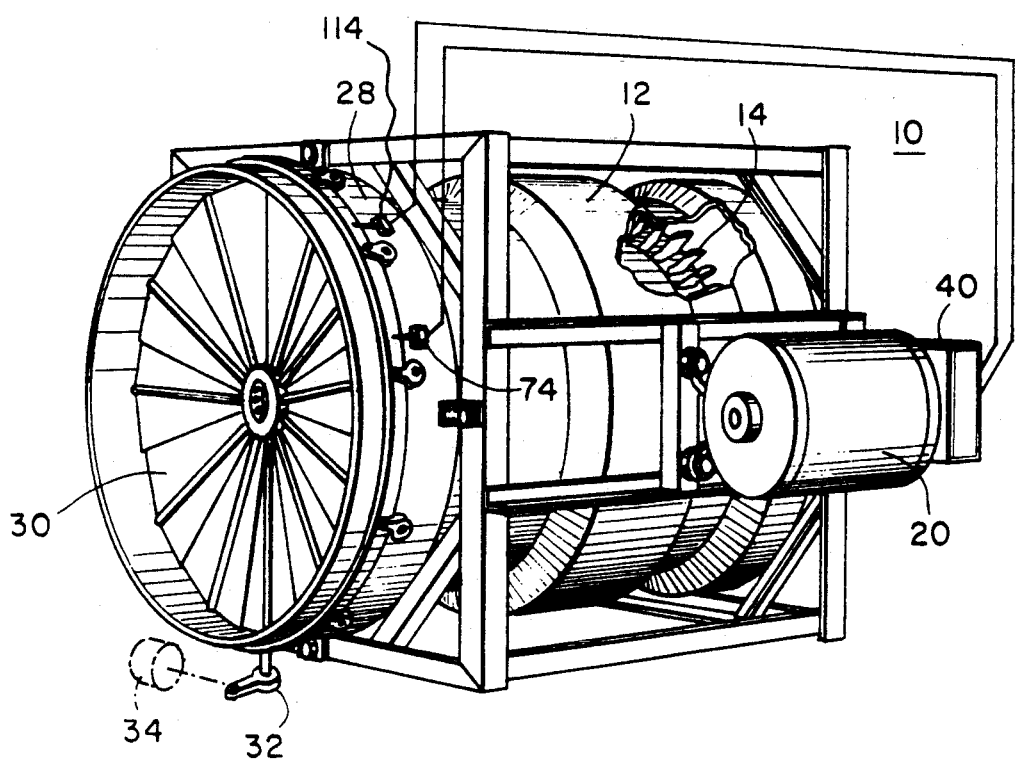
FIG. 1 shows a fan unit embodying the subject invention.

A fan unit embodying the subject invention is generally shown in FIG. 1 and referred to by the reference numeral 10. Those skilled in the art will recognize that the fan unit 10 may include a variety of configurations, and that the embodiment of fan means shown and described is to be taken as representative rather than as limiting.

The fan unit 10 includes a casing 12 surrounding a fan wheel or cage 14. A driven sheave (not shown) is fixed on a fan shaft (not shown) with the fan wheel 14 so that concurrent rotation of the fan wheel 14 and driven sheave is assured. Bearings (not shown) are provided to enable free rotation of the fan wheel 14 within the casing 12. A two-speed electrically powered motor 20 is disposed on the casing 12 with the axis of the motor 20 parallel to that of the fan shaft. The motor 20 is provided with a drive sheave (not shown), and a drive belt (not shown) extends between the drive sheave and the driven sheave to effect the transfer of power from the motor 20 to the fan wheel 14 when the fan unit 10 is operating.

A frame 28 attached to the casing 12 supports a plurality of inlet guide vanes or dampers 30. The inlet guide vanes 30 are moveably disposed in the frame 28 so as to permit a change in the position of the vanes 30 with respect to the casing 12 and thereby control the flow of air into the fan wheel 14 by a greater or lesser amount, as dictated by maximum and minimum opening limits. The inlet guide vanes 30 control the airflow into the fan wheel 14 by physically pre-swirling the airflow to a greater or lesser amount. A vane control means 32 acts in response to the demands of the VAV air system (not shown) in which the fan unit 10 is installed to vary the position of the vanes 30 with an actuator 34. Since there are a number of suitable vane control means, and such means are not in themselves part of the subject invention, no further discussion of the vane control means 32 is believed to be necessary.

Figure 2:
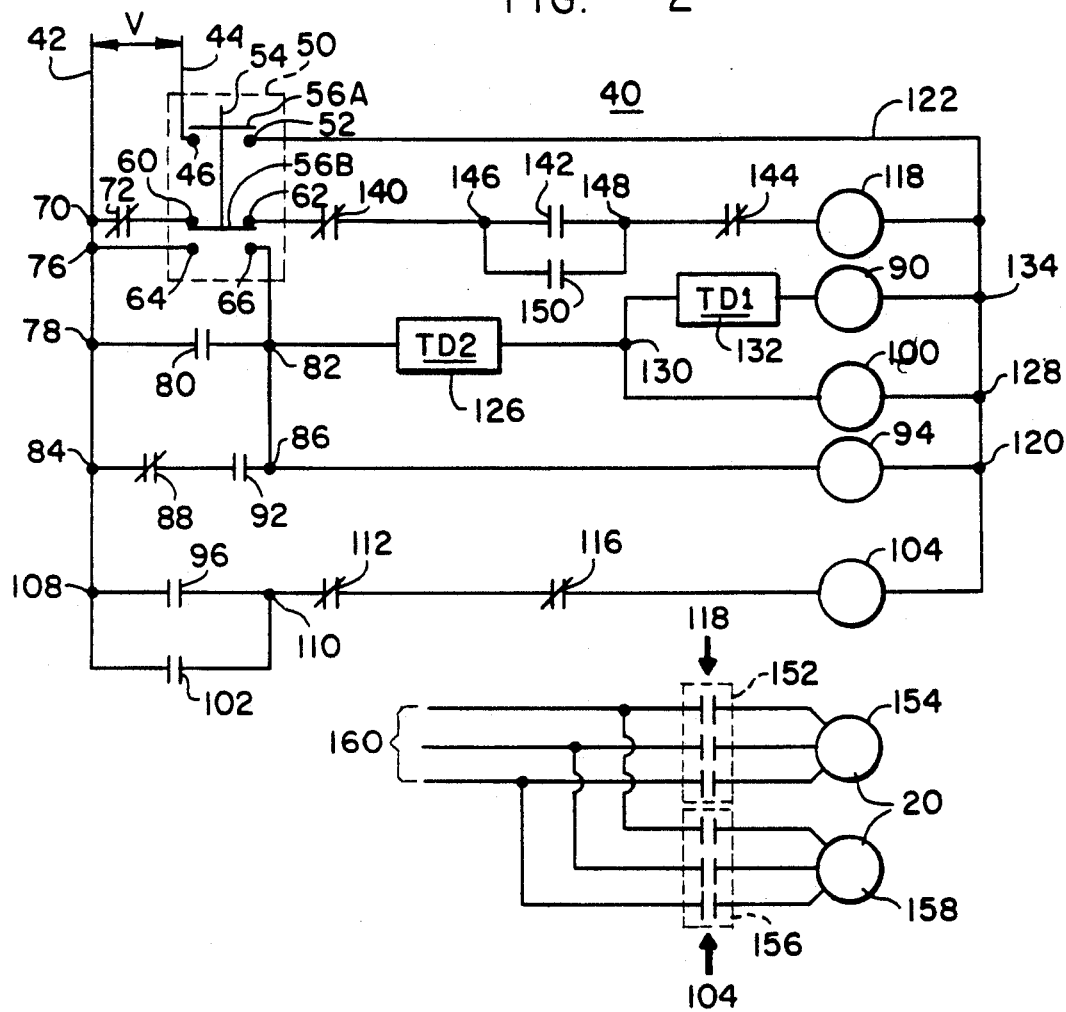
FIG. 2 depicts in schematic the electronic controller according to the subject invention.

An electronic motor controller 40 is provided on the motor 20 to control the operation of the motor 20. The motor controller 40 is shown is schematic form in FIG. 2. A conventional power supply is connected to the connections, first line 42 and second line 44 to provide a control system voltage, preferably in the range of 24 volts–120 volts DC or AC to the controller 40. The line 44 connects to a first switch terminal 46 in a start switch means 50. A second switch terminal 52 in the switch 50 cooperates with the first switch terminal 46 to form a set of contacts, first switch pair 46–52.

The start switch 50 is a momentary action type switch which is preferably manually operated but, may be operated by a solenoid or other means where automatic or remotely controlled action is desired. A two-position plunger 54, which is normally in the first position as shown, includes contact means such as a pair of contactors 56A and 56B for providing connections between the terminals or switch pairs in the start switch 50. The contactor 56A will close the circuit between the first switch pair 46–52 when the plunger 54 is moved to the second position, so that the first switch pair 46–52 is normally open. A second set of contacts, second switch pair 60–62 is normally closed by contactor 56B when the plunger 54 is in the first position, while the contactor 56B closes a Normally Open third set of contacts, third switch pair 64–66 when the plunger 54 is moved to the second position.

A junction 70 is provided on the line 42, with the Normally Closed contacts 72 of a first microswitch 74 connected between the junction 70 and the contact 60 of the second switch pair 60–62. Likewise a connection is provided from the line 42 at a junction 76 to contact 64 of the third switch pair 64–66. A set of Normally Open contacts 80 of the microswitch 74 are connected to line 42 at a junction 78 and to the terminal 66 of the third switch pair 64–66 at a junction 82. Also connected to the line 42, at a junction 84, and to the terminal 66 of the third switch pair 64–66, at a junction 86, is a set of Normally Closed contacts 88 for a first relay 90 and a set of Normally Open contacts 92 for a second relay 94. A set of Normally Open contacts 96 for a third relay 100 are disposed in parallel connection with a set of Normally Open contacts 102 for a Low Speed Motor Contactor relay 104 between a junction 108 on line 42 and a junction 110.

A set of Normally closed contacts 112 for a second Microswitch 114, a set of Normally Closed contacts 116 for a High Speed Motor Contactor relay 118, and the Low Speed Motor Contactor relay 104 are disposed in series connection between junctions 110 and 120. The second relay 94 is connected between the junctions 86 and 120. A connection or line 122 also extends from the junction 120 to the terminal 52 of the first switch pair 46–52.

A first time delay relay 126 is in series connection with the third relay 100 between the junction 82 and a junction 128 on line 122. A junction 130 is provided between the first time delay relay TD2, referred to by reference numeral 126 and the third relay 100, with a second time delay relay TD1, referred to by reference numeral 132 and the first relay 90 in series connection from the junction 130 to the line 122 at a junction 134.

A set of Normally Closed contacts 140 for the second relay 94 are connected in series with a set of Normally Open contacts 142 of the second microswitch 114, a set of Normally Closed contacts 144 of the Low Speed Motor Contactor 104, and the High Speed Motor Contactor 118. The High Speed Motor Contactor 118 is then connected to a junction 138 on line 122. On either side of the Normally Open contacts 142 of the second microswitch 114 are junctions 146 and 148, permitting connection of a set of Normally Open contacts 150 of the High Speed Motor Contactor 118 in parallel with the Normally Closed contacts 144 of the Low Speed Motor Contactor 104.

The High Speed Motor Contactor 118 is also physically connected to Normally Open contacts 152 for energizing high speed coils 154 of the motor 20 and the Low Speed Motor Contactor 104 is physically connected to Normally Open contacts 156 for energizing low speed coils 158 of the motor 20 when line voltage is applied to lines 160.

Those skilled in the art will recognize that the term contacts refers to means for selectively completing an electrical circuit, and that Normally Open contacts do not in their normal position complete a circuit while Normally Closed contacts in their normal position do complete a circuit.

In operation, control system voltage is applied to lines 42 and 44, and line voltage is supplied to lines 160. The plunger 54 of the start switch 50 is momentarily operated, closing the first switch pair 46–52 and the third switch pair 64–66, and opening the second switch pair 60–62. This ensures that the high speed coils 154 will not be activated upon startup, since the circuit path through the High Speed Motor Contactor 118 cannot be completed through the second switch pair 60–62. The circuit path through the third switch pair 64–66 is completed to energize the second relay 94 to open the Normally Closed contacts 140, ensuring that the circuit path through the High Speed Motor Contactor 118 cannot be completed through the second switch pair 60–62 during startup of the motor after operation of the plunger 54 is completed.

Operation of the plunger 54 and subsequent energization of the second relay 94 also closes the Normally Open contacts 92, providing current to the first time delay relay 126. Upon expiration of the preset time delay, current is passed through the relay 126 to energize the second time delay relay 132 and to energize the third relay 100. Energization of the third relay 100 closes the Normally Open contacts 96. This closure completes a circuit from line 42 through the now-closed Normally Open contacts 96, the Normally Closed contacts 112 and the Normally Closed contacts 116 to energize the Low Speed Motor Contactor 104. With the Low Speed Motor Contactor 104 energized, the Normally Open contacts 156 are closed so that current is supplied through lines 160 to the low speed coils 158, and the motor 20 is thus started at the low speed. Energization of the Low Speed Motor Contactor 104 also closes the Normally Open contacts 102 to ensure a continued current flow to the Low Speed Motor Contactor 104, and opens the Normally Closed contacts 144 to prevent concurrent activation of the High Speed Motor Contactor 118.

Upon the expiration of the preset time delay period of the second time delay relay 132, current is passed to the first relay 90 and the Normally Closed contacts 88 are opened. As will be shown, this causes cessation of current to and de-energization of the second relay 94, which causes the opening of the Normally Open contacts 92 and closure of the Normally Closed contacts 140. This action also prevents current flow through the first time delay relay 126, so that the first relay 90 and third relay 100 are de-energized. The Normally Closed contacts 88 of the first relay 90 and the Normally Open contacts 96 of the third relay 100 return to their respective normal conditions. Low speed operation of the motor 20 continues, however, due to current flow through the alternative current path of the closed Normally Open contacts 102, completing the low speed start sequence.

Figure 3:
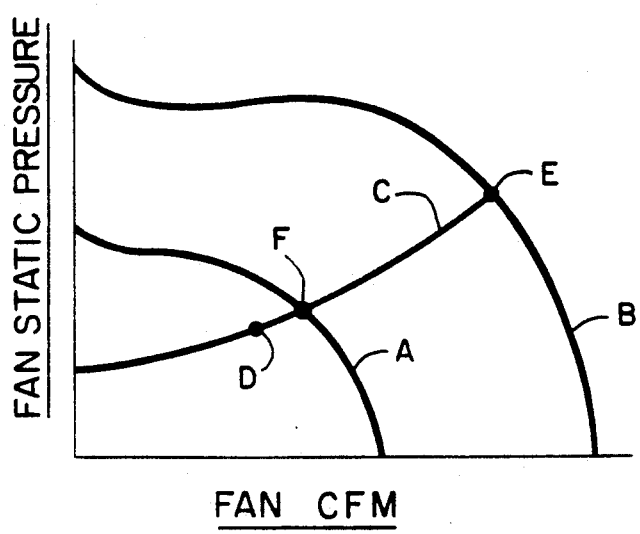
FIG. 3 shows the effect of the operation of the subject invention in response to static pressure changes.

As seen in FIG. 3, the cubic feet per minute which the fan can deliver (fan CFM) varies with the static pressure, with the fan CFM being lower in low speed operation, as reflected in curve A. Curve B reflects generally the higher fan CFM delivery rate and static pressure which may be expected during high speed operation. Curve C reflects the air flow rate and static pressure which may be typically expected in a VAV air supply system employing a fan unit 10 embodying the subject invention. It must be understood that these curves A, B and C are representative only and are included for the purpose of enhancing the understanding of the operation of the subject invention, and that no numerical units are included since these curves are not included to define specific operating parameters of any particular fan unit 10 or system employing such a fan unit 10.

With the low speed coils 158 of the motor 20 energized and operating at low speed, the inlet guide vanes 30 are modulated between the maximum and minimum opening limits by the action of the actuator 34 in response to control indications from the vane control means 32. If the static pressure requirements of the VAV air supply system are not met, the vanes 30 will be modulated to the maximum open limit or first condition and the second microswitch 114 is mechanically tripped in response, as shown at point D on the curve C.

Operation of the second microswitch 114 opens the Normally Closed contacts 112, de-energizing the Low Speed Motor Contactor 104, and closes the Normally Open contacts 142. De-energization of the Low Speed Motor Contactor 104 permits the Normally Open contacts 102 and the Normally Closed contacts 144 to return to their normal condition. Current is then able to pass through the Normally Closed contacts 72 of the first microswitch 74, the second switch pair 60–62, the Normally Closed contacts 140 of the second relay 94, the now-closed Normally Open contacts 142 of the second microswitch 114 and the Normally Closed contacts 144 of the Low Speed Motor Contactor 104 to energize the High Speed Motor Contactor 118.

When the High Speed Motor Contactor 118 is energized, the Normally Open contacts 150 are closed and the Normally Closed contacts 116 are opened. With the Normally Closed contacts 116 open, current flow is prevented to the Low Speed Motor Contactor 104 during the time the High Speed Motor Contactor 118 is energized. The Normally Open contacts 152 are closed and line current can flow through the high speed coils 154 of the motor 20. Closure of the Normally Open contacts 150 ensures current flow to the High Speed Motor Contactor 118, since the vanes 30 will modulate to a position which is less than the maximum opening limit and the second microswitch 114 will be returned to the normal position. This action will open the Normally Open contacts 142 and close the Normally Closed contacts 112.

If the operation of the fan motor 20 at the high speed exceeds a preset limit, shown as point E on the curve C in FIG. 3, the vanes 30 are modulated to a minimum open limit or second condition, and in response the first microswitch 74 is tripped. This action opens the Normally Closed contacts 72. Current is then denied to the High Speed Motor Contactor 118, returning the Normally Open contacts 152, the Normally Open contacts 150 and the Normally Closed contacts 116 to their normal conditions. Simultaneous to the opening of contacts 72, the Normally Open contacts 80 are closed, which initiates the low speed start sequence in the same manner as the operation of the start switch 50.

It should be noted that the point D, at which the first microswitch 74 is tripped, is shown disposed in the preferred position on the VAV system curve C to prevent undesirable cycling between low speed and high speed operation of the fan motor 20. Positions between Points D and F on the VAV system curve C can satisfy duct static pressure requirements at either low speed with vanes modulated to near the maximum open limit, ar at high speed with vanes 30 modulated to a position which corresponds to Point D. Point D also corresponds to that point at which the fan unit 10 delivers approximately one half the CFM delivered by the fan unit when operating at Point E.

For purposes of discussion only, it has been assumed herein that the first microswitch 74 and the second microswitch 114 are operated only when the vanes are operated only to fully opened or closed positions. Those skilled in the art will recognize that this is not a necessary limitation, and is assumed only for purposes of convenience and improved clarity.

Those skilled in the art will appreciate that the subject controller 40 provides several important benefits and improvements in the art. This includes a low part count, which provides cost benefits in both initial manufacture and in maintenance, and also improves the reliability of the controller 40. Another benefit is automatic speed control or switching in a two-speed motor equipped fan unit 10, which operates in response to the VAV system modulation requirements. This provides independent operation of the fan unit 10 at the most efficient speed, providing reduced annual power consumption, and substantial energy and cost savings in operation. An important ergonomic benefit is the substantial reduction in generated noise when the motor 20 of the fan unit 10 is operating at low speed.

Modification to the preferred embodiment of the subject inventions will be apparent to those skilled in the art within the scope of the claims that follow hereinbelow.

What is claimed is:

1. A controller for controlling a mechanically modulated two-speed fan unit in a ducted ventilation system, in response to static pressure in the ducted system and a position of a modulating means, said controller comprised of:

start switch means having a first, second and third set of contacts, said second and third set of contacts connected to a first power supply line and said first set of contacts connected to a second power supply line;

first relay means in series connection with first and second time delay relay means and said third set of contacts of said start switch;

second relay means in connection with the third set of contacts of said start switch;

third relay means in series connection with said first time delay relay means, said third relay means being in parallel connection with said first relay means and said second time delay relay means;

motor low speed contactor relay means connected to said first power supply line; and motor high speed contactor relay means connected to said second set of contacts of said start switch.

2. The controller as set forth in claim 1 wherein said first relay means further includes a Normally Closed contact means in parallel connection with said third set of contacts of said start switch.

3. The controller as set forth in claim 1 wherein said second relay means further includes a Normally Closed contact means in series connection with said motor high speed contactor relay means and a Normally Open contact means in parallel connection with said third set of contacts of said start switch.

4. The controller as set forth in claim 1 wherein said third relay further includes Normally Open contact means in series connection with said motor low speed contactor relay means.

5. The controller as set forth in claim 4 wherein said motor low speed contactor relay means includes a Normally Open contact means in parallel connection with said Normally Open contact means of said third relay, and further includes a Normally Closed contact means in series connection with said motor high speed contactor relay means.

6. The controller as set forth in claim 1 wherein said controller includes first microswitch means responsive to the movement of said modulating means into an open position.

7. The controller as set forth in claim 1 wherein said controller includes second microswitch means responsive to the movement of said modulating means into a closed position, said microswitch means including Normally Open contact means in series connection with said motor high speed contactor relay means.

8. The controller as set forth in claim 6 wherein said motor high speed contactor relay means includes a Normally Open contact means in parallel with the Normally Open contact means of said second microswitch means, and further includes a Normally Closed contact means in series connection with the motor low speed contactor relay means.

9. A fan unit for use in a variable air volume system, said fan unit comprised of:
 a casing;
 a fan wheel rotatably disposed within said casing;
 a two-speed fan motor operably connected to said fan wheel;
 an inlet guide vane positionable between an open and a closed position; and
 means for controlling the two-speed fan motor, said means for controlling including
  (i) start switch means having a first, second and third set of contacts, said second and third set of contacts connected to a first power supply line and said first set of contacts connected to a second power supply line;
  (ii) first relay means in series connection with first and second time delay relay means and said third set of contacts of said start switch;
  (iii) second relay means in connection with the third set of contacts of said start switch;
  (iv) third relay means in series connection with said first time delay relay means, said third relay means being in parallel connection with said first relay means and said second time delay relay means;
  (v) a motor low speed contactor relay means connected to said first power supply line and to a low speed coil of said two-speed fan motor; and
  (vi) a motor high speed contactor relay means connected to said second set of contacts of said start switch and to a high speed coil of said two-speed fan motor.

10. The fan unit as set forth in claim 9 wherein said first relay means further includes a Normally Closed contact means in parallel connection with said third set of contacts of said start switch.

11. The fan unit as set forth in claim 9 wherein said second relay means further includes a Normally Closed contact means in series connection with said motor high speed contactor relay means and a Normally Open contact means in parallel connection with said third set of contacts of said start switch.

12. The fan unit as set forth in claim 9 wherein said third relay further includes Normally Open contact means in series connection with said motor low speed contactor relay means.

13. The fan unit as set forth in claim 12 wherein said motor low speed contactor relay means includes a Normally Open contact means in parallel connection with said Normally Open contact means of said third relay, and further includes a Normally Closed contact means in series connection with said motor high speed contactor relay means.

14. The fan unit as set forth in claim 9 wherein said controller includes first microswitch means responsive to the positioning of said inlet guide vane into said open position.

15. The fan unit as set forth in claim 9 wherein said controller includes second microswitch means responsive to the positioning of said inlet guide vane into said closed position, said second microswitch means including Normally Open contact means in series connection with said motor high speed contactor relay means.

16. The fan unit as set forth in claim 15 wherein said motor high speed contactor relay means includes a Normally Open contact means in parallel with the Normally Open contact means of said second microswitch means, and further includes a Normally Closed contact means in series connection with the motor low speed contactor relay means.

17. A method of controlling a two-speed fan in a ducted ventilation system where the output of the fan is modulated by the use of mechanically positionable airflow modulation means, comprising the steps of:
 operating said fan at the lower of said two speeds;
 sensing the static pressure in said ducted system;
 positioning said modulation means to increase the output of said fan while said fan is in said lower of said two speeds in order to meet the static pressure requirements of said ventilation system;
 sensing the movement of said modulation means into an open position when said fan is operating at the lower of said two speeds;
 switching the speed of said fan from the lower of said two speeds to the higher of said two speeds in response to a condition where said fan is unable to satisfy duct static pressure requirements at said lower of said two speeds subsequent to said modulation means having moved into said open position;
 modulating said mechanical modulation means toward said closed position if the output of said fan, when said fan is operating at the higher of said two speeds, exceeds the static pressure requirements of said ventilation system;
 sensing the movement of said modulation means into a closed position when said fan is operating at the higher of said two speeds; and
 switching the speed of said fan from the higher of said two speeds to the lower of said two speeds when system static pressure requirements are exceeded by the operation of said fan at the higher of said two speeds subsequent to said modulation means having moved into said closed position.

18. The method according to claim 17 further comprising the step of preventing the cycling of said two-speed fan between the lower and the higher of said two speeds by preventing the occurrence of said step of switching the speed of said fan from the lower of said two speeds to the higher of said two speeds when systems static pressure requirements are met by the operation of said fan at the lower of said two speeds when said mechanical modulation means are positioned in said open position and by preventing the occurrence of said step of switching the speed of said fan from the higher of said two speeds to the lower of said two speeds when system static pressure requirements are met but not exceeded by the operation of said fan at the higher of said two speeds when said mechanical modulation means are positioned in said closed position.

19. The method according to claim 18 wherein said step of operating said fan in the lower of said two speeds includes the steps of signalling said fan to start in the lower of said two speeds and delaying the start of said fan in the lower of said two speeds, after receipt of said start signal, for a predetermined period of time.

20. The method according to claim 19 further comprising the step of preventing said fan from starting in the higher of said two speeds.

* * * * *

UNITED STATES PATENT AND TRADEMARK OFFICE
CERTIFICATE OF CORRECTION

PATENT NO. : 5,241,253
DATED : August 31, 1993
INVENTOR(S) : Andrew J. Schlangen It is certified that error appears in the above-identified patent and that said Letters Patent is hereby corrected as shown below:

Column 5, Line 57, "one half" should read --one-half--.

Signed and Sealed this

Fifth Day of April, 1994

*Attest:*

BRUCE LEHMAN

*Attesting Officer*  *Commissioner of Patents and Trademarks*